Patented Jan. 12, 1954

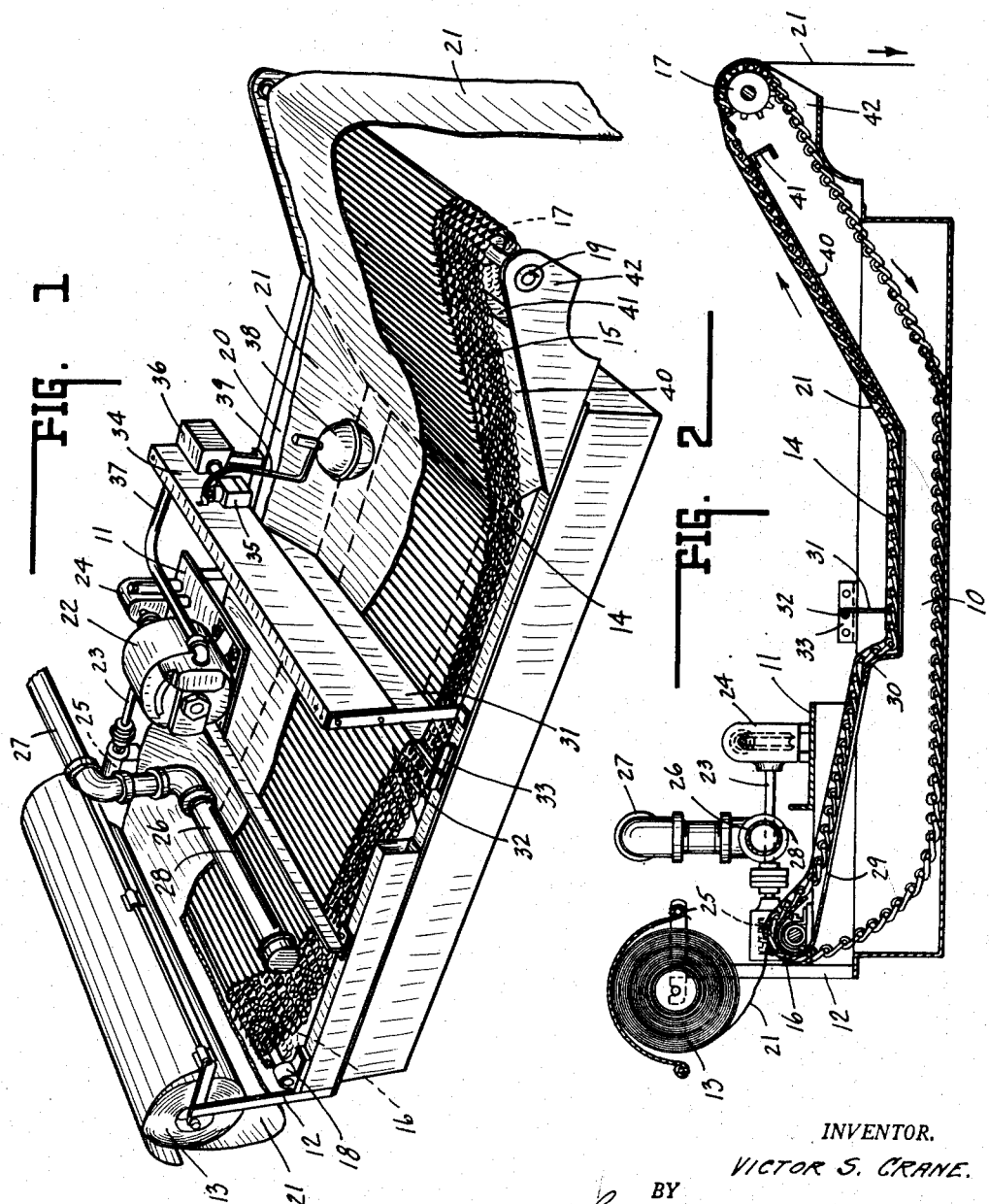

2,665,812

UNITED STATES PATENT OFFICE 2,665,812

LIQUID FILTER DEVICE

Victor S. Crane, Lebanon, Ind., assignor to Delpark Corporation, Lebanon, Ind., a corporation Application October 19, 1950, Serial No. 191,025

3 Claims. (Cl. 210—196)

This invention relates to a liquid filter device for filtering liquids containing solids in suspension such as the filtering of fruit and vegetable juices as for example, filtering and reclaiming cooling and cutting lubricants, parts washing solvents, abrasive and detergent materials in liquid form. Many other uses may be made of the device wherein it is desired to filter a continuous flow of liquid; reference being made to the application of Victor S. Crane and Paul R. Honan, filed March 9, 1950, Serial No. 148,711, for "Liquid Filter Device."

For example, in operation of metal cutting machines it is necessary to constantly flow a cooling and cutting lubricant over the tool and work for the multiple purpose of dissipating heat, lubricating the surfaces and carrying away the cuttings. It is also desirable to continuously return the lubricant from a sump for re-use until it becomes so saturated with the cutting dust as to lose its effectiveness. It thereupon becomes necessary to replace the lubricant and clean the sludge from the sump entailing a loss of material, as well as time and labor in cleaning out the sludge.

It is object of this invention to provide a continuous filtering device as well as a solids or sludge disposing unit such that a liquid containing solids in suspension may be separated therefrom for producing a substantially solid free liquid for any use, a liquid free solid or both. The invention further provides for such continuous filtering wherein it is desired to re-use liquid to prevent waste. This is accomplished by flowing the liquid in any suitable manner onto a sheet of filter media supported above a suitable receptacle by a perforate supporting conveyor through which the liquid may readily pass after filtering through the said media, and periodically and progressively moving the filter sheet to present a fresh portion thereof as the solids or sludge build up thereon during the filtering process; the filter sheet carrying the solids to a receptacle for discharge therein wherein reclamation thereof is desired.

In the filtering of some materials, particularly wherein there is a heavy deposit of solids, the filter paper becomes impregnated therewith such as to resist the passage of the liquid therethrough resulting in a build up of both liquid and solids. The feature of this invention, therefore, resides in the provision of a free filtering and self cleansing ramp section sloping gradually to the depressed filter pocket over which the material will flow before coming to rest in the pocket. Such flow will permit filtering of a substantial portion of the liquid before reaching the filter pocket and the filter paper will be swept clear of any sludge forming deposit such as to materially retard the filtering action. By means of such free filtering ramp section, the solids will be substantially freed of the liquid upon reaching the filter pocket with the consequent reduction in the time required for completing the filtering of the liquid through the filter pocket.

Another feature of the invention resides in the provision of an elongated incline of the filter medium as it is carried from the filter pocket to the discharge end of the device, which permits drainage back into the filter pocket of any remaining liquid so that as the filter paper finally emerges at the discharge end of the device it will carry and dispose of the sludge substantially freed of the liquid, the freed or filtered liquid having been reclaimed in the sump of the tank.

Various features and applications of the invention will become apparent as hereinafter pointed out in the following specification and claims, having reference to the accompanying drawings.

The full nature of the invention will be understood from the accompanying drawings and the following description and claims:

Fig. 1 is a perspective view of the filter showing it in operation with a section of the filter paper removed.

Fig. 2 is a central vertical section through the device, with parts removed.

In the drawings there is shown, as an example of one application of the invention, a filtering device for receiving a continuous flow of liquid to be filtered. The device includes a tank or sump 10, which may comprise any receptacle for containing or circulating the filtered liquid, having a driving support 11 mounted to one side thereof. Extending upwardly from one end of the tank 10 and secured thereon, there is a pair of standards 12 mounting at the upper end thereof a roll of filter media 13 preferably in sheet form.

Overlying the tank 10 there is provided a perforate filter sheet carrying a conveyor, such as an endless slatted belt 14 having flexible perforate side skirts 15 formed with a series of apertures therein. The conveyor 14 is carried by spaced rollers 16 and 17 rotatably mounted in the bearing blocks 18 and 19, respectively, supported by the side walls of the tank 10 adjacent the opposite ends thereof. Said rollers are provided with a series of teeth for driving engagement with the slatted formation fo the conveyor 14 for periodically driving said conveyor in the manner hereinafter described.

The length of the conveyor relative to the spacing of the rollers 16, 17, is such that it sags down between them, as best illustrated in Fig. 2. On each side wall of the tank 10 and extending inwardly therefrom adjacent the upper edge thereof there are provided inwardly sloping side lifting aprons 20 over which the side skirts 15 are caused to ride for elevation thereof to thereby form sloping side walls for containing the liquid discharged therein. A filtering sheet 21 which may be of any suitable filter paper or the like, is carried by the roller 13 to extend over and lie upon the conveyor 14 and its side skirts 15, sagging down with the conveyor and supported thereon to form a filter media therefor.

Carried by the driving support 11 there is provided a driving motor 22 which drives a shaft 23 through reduction gears within a gear box 24, the shaft 23 driving the roller 16 through a worm and gear drive indicated at 25. Thus, upon the motor 22 being energized the conveyor 14 and the filter paper carried thereby is slowly moved forwardly over the roller 17 at the discharge end of the device.

Adjacent the driving roller 16 and filter media 13 there is provided a material discharge head 26 connected with a pipe 27 leading from the source of material to be filtered. Said head extends transversely of the conveyor 14 and filter sheet immediately thereabove for discharging the material to be filtered across the full width thereof through a longitudinal slot 28 provided therein. The material then flows down the slightly sloping ramp section of the device, which ramp section is supported by the sloping apron 29 carried by the side walls of the tank 10, the central portion of which apron is open to the conveyor and filter for passage of liquid into the sump of the tank. As the liquid flows down the ramp section, liquid will be filtered therefrom, but there will be sufficient flow of liquid to wash away residue of solids and thereby keep the ramp section of the media substantially free of material. The ramp section terminates in a drop off formed by the downwardly curved end portion 30 of the apron to form the pocket section of the filter. The remaining liquid and solids accumulate in the pocket section which is at the lowermost level of the conveyor and filter, in which the material builds up together with some unfiltered liquid, but during which build up in the pocket section liquid will continue to filter through into the sump.

Extending transversely of the tank adjacent the drop off from the ramp section to the pocket section, there is provided a pivotally mounted swinging baffle plate 31. Said baffle plate is suspended from laterally extending pins 32 at each end thereof adjustably mounted in a bracket 33 carried by the side walls of the tank, to be selectively positioned in one of the several openings provided therein. The baffle acts to level off and control flow of material from the ramp section into the pocket section at the drop off, as well as sweep the filter media when it progresses forwardly to the discharge end of the device. Furthermore, said baffle provides a means for checking the turbulent action by the delivery of the fluid from the discharge head 26 causing the liquid to flow more quietly after passing the baffle so that a more effective settling of the foreign matter therefrom will result.

Mounted on the tank forwardly of the drop off and baffle there is a bracing panel 34 to which is secured a microswitch 35, connected with an electrical connection box 36, which controls the line 37 to the motor 22. The microswitch 35 is controlled by a float 38 carried by a float arm 39, which arm is pivotally supported on the bracing panel 34 for control of the microswitch. The float extends into the pocket section at a position relative to the filtering surface thereof to control the height of the mass of sludge accumulating therein. Upon the sludge building up to a predetermined height in the pocket the float is elevated to energize the motor 22 and cause the conveyor 14 to be driven forwardly up the inclined discharge section, carrying the filter paper with it. Thus, a fresh section of filter paper moves down the ramp section into the pocket section, whereupon the float drops to its lowermost position, breaking the circuit through the switch 35 and discontinuing further driving action of the motor and conveyor 14.

Between the pocket section and the discharge end there is an upwardly inclined apron 40 supported by a cross brace 41 on end extensions 42 of the tank carrying the bearings 19 and rollers 17. Upon the motor 22 being operated to advance the conveyor and filter media, that portion thereof which has lain in the pocket section and become clogged and built up with a mass of sludge, is moved up the inclined discharge section where it rests until the next advancing movement. On this incline any remaining free liquid in the sludge drains back toward the pocket section and either enters that section or filters through the discharge section into the sump immediately therebelow. As the conveyor and filter media are periodically advanced, the conveyor will pass about the roller 17 to return through the sump of the tank while the filter paper with heavily caked sludge will drop over the discharge end into any suitable container, substantially free of liquid.

From the foregoing it will be observed that the filtering action progresses through three steps or sections of the device; first through the slightly inclined ramp section which is maintained by liquid flow substantially free of solids; then into the pocket section where the sludge is confined and built up during its draining and filtering action to a predetermined depth; whereupon it is finally carried up the incline of the discharge section for final draining of liquid. Such multiple filtering actions materially speed up the filtering cycle as between one advancing movement of the filter media and the following movement. This results in a more efficient filtering operation which will handle materials without undue build up of sludge and liquid in the filtering pocket.

It will, therefore, be observed by way of one example, that through the medium of such filtering device fresh liquid, such as cooling and cutting lubricant, may be continuously maintained in circulation and retain its efficiency, any suitable means being provided for effecting a continuous flow from the sump of the tank through a processing machine or the like and back through the discharge head 26. Thus, in the case of a cooling and cutting lubricant, it may be continuously filtered and used indefinitely, effecting a substantial saving in replacement. On the other hand, the solids or sludge comprising cuttings and metal dust, may be separated from the lubricant in a substantially dry state for use as a by-product. The machine, therefore, eliminates the usual requirement of periodically cleansing out the sump and permits ready packaging of this waste material for use in the manufacture of abrasives and the like for which it has substantial value.

As above pointed out, various applications of the device may be made wherein it is desired to separate the solids from a liquid for re-use or circulation, such as fruit or vegetable juices, liquid polishing or cleaning material involving abrasives or detergents, lubricating and cooling liquids.

The invention claimed is:

1. A liquid filter including a tank having a sump for receiving filtered liquid, an endless perforate conveyor carried by said tank to extend over said sump, a supporting roller mounted at each end of said tank about which said conveyor is looped to sag into said tank, a driving mechanism connected with one of said rollers for progressively moving said conveyor from the liquid receiving end to the discharge end thereof, a filter media supported and carried by the upper lap of said conveyor from the liquid receiving end thereof to the discharge end, a liquid discharge head extending over said receiving end, lifting aprons extending along the side walls of said tank engaging and raising the side edges of the upper lap of said conveyor and media to retain the liquid therein, a downwardly sloping elongated apron on said tank supporting the liquid receiving section of the upper lap of said conveyor and directing it downwardly at an angle and terminating in a drop off portion to cause a gradual flow of liquid while permitting filtering thereof, a substantially level conveyor support on said tank leading from said drop off portion to provide an elongated depressed filtering pocket section, a movable baffle carried by said tank adjacent said drop off portion across and within said pocket section, a liquid level control member extending into said pocket section operatively connected with said driving mechanism to actuate it upon a predetermined level of filtering material accumulating in said pocket section for causing said conveyor to move said media forwardly therefrom, and an upwardly sloping elongated apron on said tank leading upwardly from said pocket section supporting the discharge section of the upper lap of said conveyor and media to effect liquid drainage back to said pocket section.

2. A liquid filter including a tank having a sump for receiving filtered liquid, an endless perforate conveyor carried by said tank to extend over said sump, a supporting roller mounted at each end of said tank about which said conveyor is looped to sag into said tank, a driving mechanism connected with one of said rollers for progressively moving said conveyor from the liquid receiving end to the discharge end thereof, a filter media supported and carried by the upper lap of said conveyor from the liquid receiving end thereof to the discharge end, a liquid discharge head extending over said receiving end, lifting aprons extending along the side walls of said tank engaging and raising the side edges of the upper lap of said conveyor and media to retain the liquid therein, a downwardly sloping elongated apron on said tank supporting the liquid receiving section of the upper lap of said conveyor and directing it downwardly at an angle and terminating in a drop off portion to cause a gradual flow of liquid while permitting filtering thereof, a substantially level conveyor support on said tank leading from said drop off portion to provide an elongated depressed filtering pocket section, a movable baffle carried by said tank adjacent said drop off portion across and within said pocket section, and an upwardly sloping elongated apron on said tank leading upwardly from said pocket section supporting the discharge section of the upper lap of said conveyor and media to effect liquid drainage back to said pocket section.

3. A liquid filter including a tank having a sump for receiving filtered liquid, an endless perforate conveyor carried by said tank to extend over said sump, a supporting roller mounted at each end of said tank about which said conveyor is looped to sag into said tank, a driving mechanism connected with one of said rollers for progressively moving said conveyor from the liquid receiving end to the discharge end thereof, a filter media supported and carried by the upper lap of said conveyor from the liquid receiving end thereof to the discharge end, a liquid discharge head extending over said receiving end, lifting aprons extending along the side walls of said tank engaging and raising the side edges of the upper lap of said conveyor and media to retain the liquid therein, a downwardly sloping elongated apron on said tank supporting the liquid receiving section of the upper lap of said conveyor and directing it downwardly at an angle and terminating in a drop off portion to cause a gradual flow of liquid while permitting filtering thereof, a substantially level conveyor support on said tank leading from said drop off portion to provide an elongated depressed filtering pocket section, a liquid level control member extending into said pocket section operatively connected with said driving mechanism to actuate it upon a predetermined level of filtering material accumulating in said pocket section for causing said conveyor to move said media forwardly therefrom, and an upwardly sloping elongated apron on said tank leading upwardly from said pocket section supporting the discharge section of the upper lap of said conveyor and media to effect liquid drainage back to said pocket section.

VICTOR S. CRANE.

References Cited in the file of this patent

UNITED STATES PATENTS

| Number | Name | Date |
| --- | --- | --- |
| 445,371 | Jewell | Jan. 27, 1891 |
| 794,631 | Milne | July 11, 1905 |
| 1,140,528 | Powers | May 25, 1915 |
| 1,837,368 | Medin | Dec. 22, 1931 |
| 2,097,529 | Nordell | Nov. 2, 1937 |
| 2,197,770 | Pruyn | Apr. 23, 1940 |

FOREIGN PATENTS

| Number | Country | Date |
| --- | --- | --- |
| 551,108 | France | Mar. 28, 1923 |